(12) United States Patent
Welter et al.

(10) Patent No.: US 8,276,246 B2
(45) Date of Patent: Oct. 2, 2012

(54) FASTENING DEVICE, IN PARTICULAR FOR HAND GRIPS FOR THE INTERIOR OF THE MOTOR VEHICLE

(75) Inventors: Patrick Welter, Lachambre (FR); Frederic Selvini, Falck (FR)

(73) Assignee: Johnson Controls Technology Company, Holland, MI (US)

( * ) Notice: Subject to any disclaimer, the term of this patent is extended or adjusted under 35 U.S.C. 154(b) by 827 days.

(21) Appl. No.: 12/161,135

(22) PCT Filed: Dec. 15, 2006

(86) PCT No.: PCT/EP2006/012104
§ 371 (c)(1),
(2), (4) Date: Feb. 18, 2009

(87) PCT Pub. No.: WO2007/087869
PCT Pub. Date: Aug. 9, 2007

(65) Prior Publication Data
US 2010/0146744 A1    Jun. 17, 2010

(30) Foreign Application Priority Data
Jan. 16, 2006  (DE) .......................... 10 2006 002 214

(51) Int. Cl.
*F16B 5/06* (2006.01)
(52) U.S. Cl. .......................................... 24/453; 24/607

(58) Field of Classification Search .................... 24/453, 24/297, 289, 295, 606–608; 411/340–342, 411/344, 15, 21; 296/214, 97.9, 1.02
See application file for complete search history.

(56) References Cited

U.S. PATENT DOCUMENTS

| | | | |
|---|---|---|---|
| 2,404,169 A * | 7/1946 | Gidden | 411/340 |
| 5,403,064 A | 4/1995 | Mahler et al. | |
| 2005/0220560 A1 * | 10/2005 | Shinozaki et al. | 411/37 |
| 2005/0248167 A1 | 11/2005 | Totani et al. | |
| 2006/0038429 A1 * | 2/2006 | Bauer | 296/214 |

FOREIGN PATENT DOCUMENTS

| | | |
|---|---|---|
| DE | 42 24 148 A1 | 1/1994 |
| EP | 0616920 B1 | 3/1994 |
| JP | 2006057647 A | 3/2006 |
| WO | WO 02/062616 A1 | 8/2002 |
| WO | WO 02/062617 A1 | 8/2002 |
| WO | WO 2004/005070 A1 | 1/2004 |
| WO | WO 2006/051787 A1 | 5/2006 |
| WO | WO 2007/087869 A1 | 8/2007 |

* cited by examiner

*Primary Examiner* — James Brittain
(74) *Attorney, Agent, or Firm* — Fletcher Yoder P.C.

(57) ABSTRACT

A fastening device, in particular for hand grips for the interior of a motor vehicle, is equipped with a bearing block, which can be inserted into a recess in a plate-like structure, with a stopper which can be inserted into the bearing block, and with means which, upon insertion of the stopper, make it possible for rear engagement of the fastening device behind a plate-like structure. The invention makes provision for the rear-engagement means to be formed separately and to be produced preferably in the manner of wings from sheet steel.

15 Claims, 3 Drawing Sheets

FASTENING DEVICE, IN PARTICULAR FOR HAND GRIPS FOR THE INTERIOR OF THE MOTOR VEHICLE

The invention relates to a fastening device, in particular for hand grips for the interior of a motor vehicle, with a bearing bracket which can be inserted into a recess in a plate-like structure, with a stopper which can be inserted into the bearing bracket, and with means which, upon insertion of the stopper, make it possible for the fastening device to engage behind the plate-like structure.

PRIOR ART

A fastening device of the type in question for fixing interior fitting parts to the body of a motor vehicle is known from the publication WO 02/062617 A1. It comprises a bearing bracket which can be locked in a recess in the vehicle body and is suitable for the rotatable attachment of hand grips and the like. Latching projections are formed integrally on the bearing bracket, which is composed of plastic, said latching projections springing back upon being pushed into the recess and subsequently being secured by means of a stopper pushed into the bearing bracket.

Such a design may have the disadvantage of the tear-out resistance of the latching connection being inadequate and of the latching projections being able to be damaged even as they are pushed into the generally sharp-edged recess in the vehicle body. Later removal may also be associated with a relatively high outlay in terms of time and resources.

PROBLEM

The invention is based on the problem of providing fastening means for the creation of a connection which is high-strength but can be released with simple means.

SOLUTION

In the case of fastening devices of the type mentioned at the beginning, the problem is solved according to the invention in that the means are formed separately, i.e. not integrally with the bearing bracket, and advantageously comprise at least one wing which, by means of insertion of the stopper, can be shifted from an installation position into a locking position.

The bearing bracket and/or the stopper are/is preferably injection molded from plastic while the wing or the wings is or are manufactured from metal, in particular from steel sheet, by punching and pressing. By this means, the bearing bracket and stopper can be given a complex design and the wing or wings a high degree of strength with relatively little outlay.

The remaining subclaims relate to further advantageous developments of the invention.

FIGURES

The figures are an exemplary and schematic representation of an embodiment of the invention.

Figure 1:
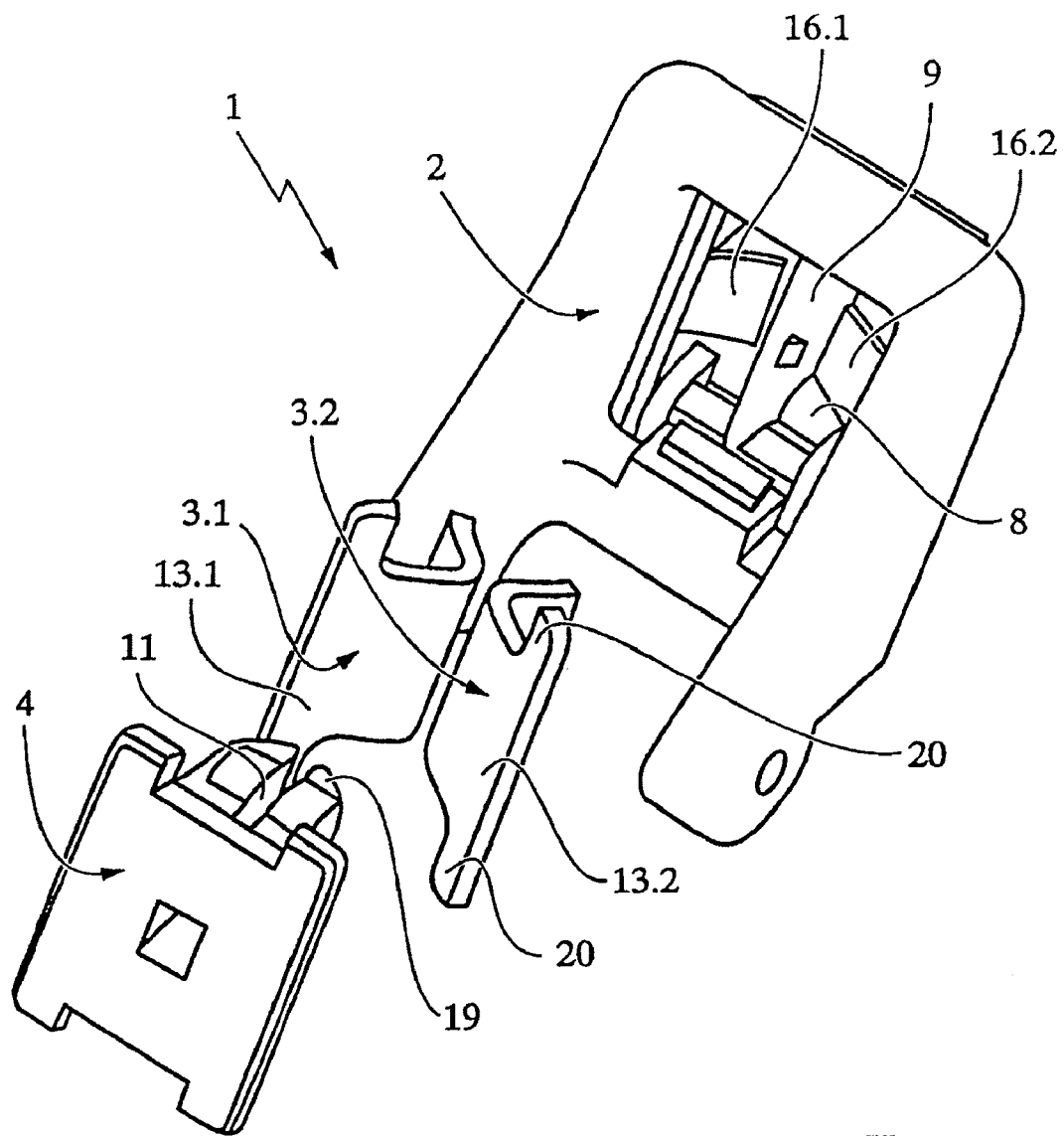
Figure 2:
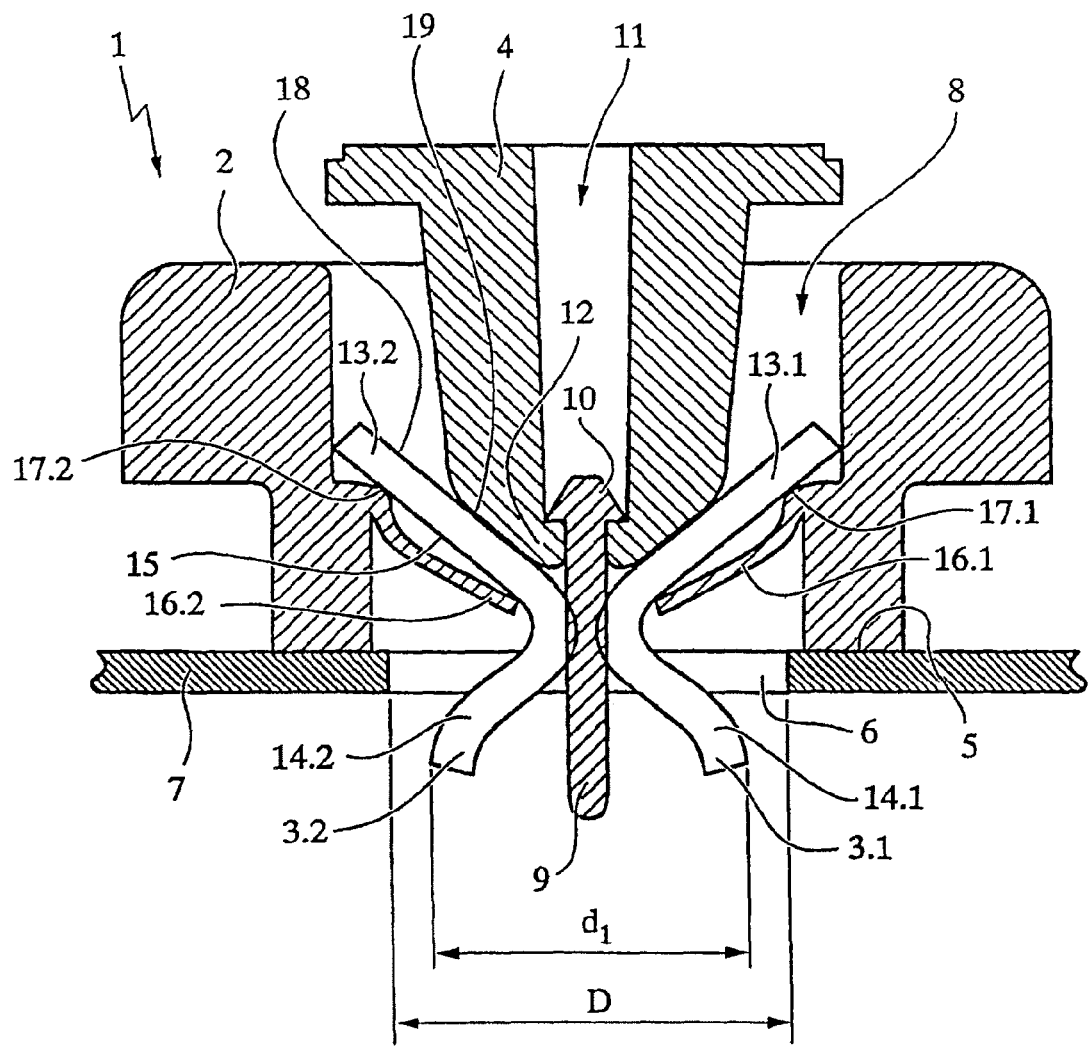
Figure 3:
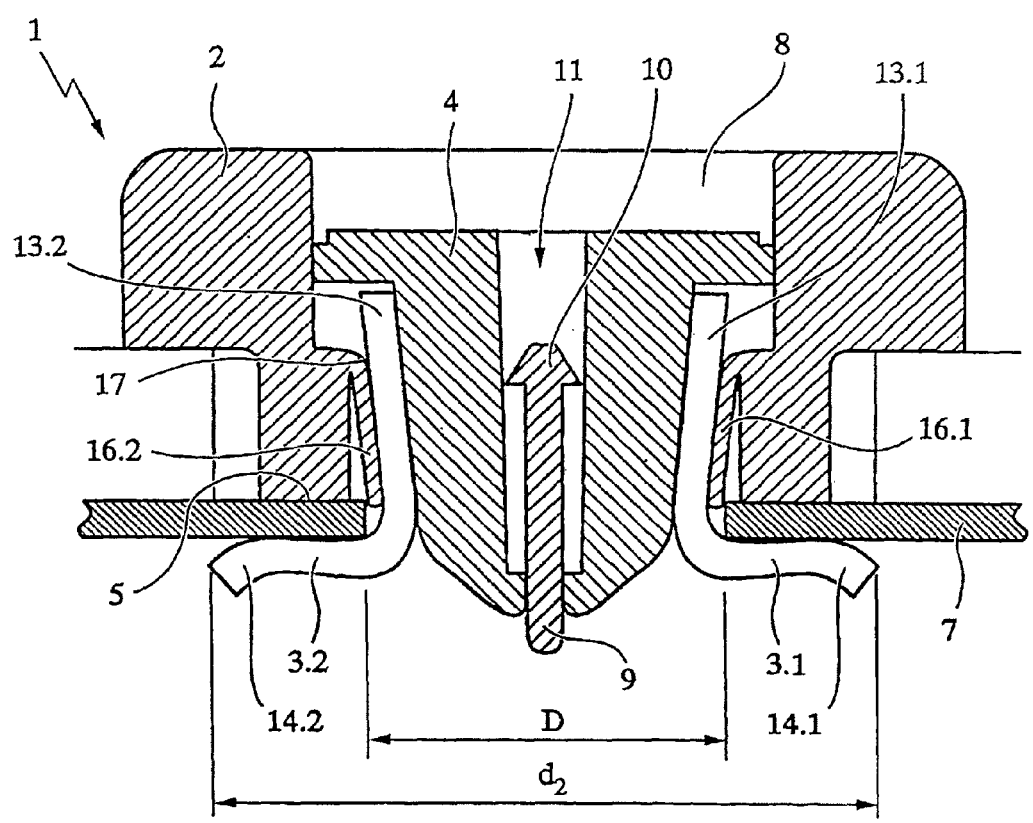

In the figures:

FIG. 1 shows the components of a fastening device designed according to the invention in a perspective illustration (exploded drawing), FIG. 2 shows a section through the fastening device according to FIG. 1 in the installation position, FIG. 3 shows the section according to FIG. 2 in the locking position.

The fastening device 1 illustrated in the figures comprises a plastic bearing bracket 2 of complex design, two wings 3 which are of L-shaped design and are composed of steel sheet, and a stopper 4 which is likewise manufactured from plastic. As is apparent from FIGS. 2 and 3, the bearing bracket 2, which is of mirror-inverted design, is provided at the bottom with a planar bearing surface 5 by means of which it is placed onto a plate-like structure provided with a recess 6, for example onto the metal sheet 7 of a vehicle body.

The bearing bracket 2 is provided with a central aperture 8 into which the stopper 4 can be pushed perpendicularly to the surface of the metal sheet 7 in the direction of the recess 6. A narrow web 9 runs in the center of the bearing bracket 2, said web dividing the aperture 8 and projecting at its protruding, lower end through the recess 6. At its upper end, the web 9 is equipped with latching hooks 10 and is held by a slot 11 in the stopper 4. In the installation position according to FIG. 2, the stopper 4 is partially introduced into the aperture 8 and is secured against being lost by means of clamp-like lugs 12 which reach around the latching hooks 10 of the web 9.

Furthermore, in the aperture 8, the L-shaped wings 3.1, 3.2 are arranged in a mirror-inverted manner with respect to each other in the installation position in such a manner that the transitions between the first, longer limbs 13.1, 13.2 and the second, shorter limbs 14.1, 14.2 bear against the mutually opposite vertical surfaces of the web 9. In this case, the upper, first limbs 13.1, 13.2 are each inclined at an angle of 45° with respect to the web 9 and are arranged entirely within the aperture 8. By contrast, the lower, second limbs 14.1, 14.2, which are oriented at right angles to the first limbs 13.1, 13.2 project through the recess 6 of the metal sheet 7 and point away from each other. The terms "at the top" and "at the bottom" refer here to the orientation of the fastening device 1 that is selected in FIGS. 2 and 3 and in which the bearing surface 5 points downward.

The maximum distance $d_1$ between the two limbs 14.1, 14.2 is dimensioned in such a manner that it is smaller than the clear width D of the recess 6. In the installation position, the fastening device 1 can therefore be placed in the region of the recess 6 onto the metal sheet 7 until the bearing surface 5 rests on the metal sheet 7.

The first limbs 13.1, 13.2 are held in position on their lower, outer surface side 15 by means of spring tongues 16.1, 16.2 integrally formed on the bearing bracket 2 and by means of shoulders 17.1, 17.2 and on their upper, inner surface side 18 by bearing against the stopper 4. The spring tongues 16.1, 16.2 extend from the shoulders 17.1, 17.2 on the outer circumference of the aperture 8, generally parallel to the surface sides 15, in a curved manner downward in the direction of the web 9 and with their free ends make contact with the first limbs 13.1, 13.2 in the vicinity of the transition to the second limbs 14.1, 14.2. The stopper 4 is designed in the contact region with the first limbs 13.1, 13.2 in such a manner that the surface side 18 of the wings 3.1, 3.2 bears over a relatively large surface region 19 against the stopper 4. The stopper 4 therefore tapers at its lower end in the manner of a wedge.

When the stopper 4 is pushed in (locking position according to FIG. 3), the wings 3.1, 3.2 are expanded outward and, by means of the lower limbs 14.1, 14.2 which now run approximately horizontally, engage behind the metal sheet 7, with their maximum distance $d_2$ now being approximately twice the clear width D of the recess 6. The pivoting movement of the wings 3.1, 3.2 takes place here about a virtual axis in the region of the shoulders 17.1, 17.2. During the expansion, the spring tongues 16.1, 16.2 are stretched and tensioned. When the stopper 4 is subsequently pulled back, the spring tongues 16.1, 16.2 rotate the wings 3.1, 3.2 back again into their installation position according to FIG. 2 such that the fastening device 1 can easily be released from the metal sheet 7. Lateral projections 20 on the upper limbs 13.1, 13.2 prevent the wings 3.1, 3.2 from being able to be pulled downward out of the bearing bracket 2.

It goes without saying that the stopper 4 is secured in its locking position against inadvertent release by means of a latching device (not illustrated) or the like.

REFERENCE NUMBERS

1 Fastening device
2 Bearing bracket
3.1, 3.2 Wing
4 Stopper
5 Bearing surface
6 Recess
7 Metal sheet
8 Aperture
9 Web
10 Latching hook
11 Slot
12 Lug
13.1, 13.2 Limb (at the top)
14.1, 14.2 Limb (at the bottom)
15 Surface side (of the limb 13)
16.1, 16.2 Spring tongue
17 Shoulder
18 Surface side (of the limb 13)
19 Surface region
20 Projection The invention claim is:

1. A fastening device for attaching hand grips to an interior of a motor vehicle, comprising:
a bearing bracket having a central aperture, the bearing bracket insertable into a recess in a surface of the interior of the motor vehicle;
a stopper insertable into the central aperture of the bearing bracket; and
at least one separately formed wing configured to move from an installation position to a locking position when the stopper is inserted into the central aperture of the bearing bracket, the at least one separately formed wing having an L-shape comprising a first limb and a second limb, wherein the first limb of the wing projects into the central aperture, and the second limb of the wing projects out of the central aperture and into the recess in the surface of the interior of the motor vehicle when the wing is in the installation position, and wherein the second limb of the wing engages behind the surface of the interior of the motor vehicle when the wing is in the locking position;
wherein the at least one separately formed wing is held in the installation position by a first force applied by at least one corresponding spring, the at least one separately formed wing configured to transition to the locked position when a second force applied by insertion of the stopper into the central aperture of the bearing bracket is greater than the first force applied by the at least one corresponding spring, and wherein the at least one corresponding spring comprises at least one spring tongue integrally formed on the bearing bracket and disposed within the central aperture of the bearing bracket.

2. The fastening device of claim 1, wherein the bearing bracket, the stopper, or some combination thereof, is formed from a material comprising plastic.

3. The fastening device of claims 1, wherein the at least one separately formed wing comprises steel sheet.

4. The fastening device of claim 1, wherein the at least one separately form wing comprises two wings disposed in a mirror-inverted arrangement.

5. The fastening device of claim 4, wherein each of the two wings comprises a transition region between a respective first limb and a respective second limb, the transition region of each of the two wings being supported by a web extending through the central aperture of the bearing bracket when the two wings are in the installation position.

6. The fastening device of claim 5, wherein the stopper is insertable by being pushed into the central aperture of the bearing bracket.

7. The fastening device of claim 6, wherein the stopper is disposed within the central aperture of the bearing bracket to hold the wings in the installation position.

8. The fastening device of claim 1, wherein the at least one separately formed wing is arranged to pivot about an actual or virtual axis.

9. The fastening device of claim 1, wherein the stopper is insertable by being pushed into the central aperture of the bearing bracket.

10. The fastening device of claim 1, wherein the stopper is disposed within the central aperture of the bearing bracket to hold the at least one separately formed wing in an installation position.

11. The fastening device of claim 1, wherein the stopper is insertable by being pushed into the central aperture of the bearing bracket.

12. The fastening device of claim 1, wherein the stopper is disposed within the central aperture of the bearing bracket to hold the at least one separately form wing in the installation position.

13. A fastening device for attaching hand grips to an interior of a motor vehicle, comprising:
a bearing bracket having a central aperture, the bearing bracket configured to be coupled to a surface of the interior of the motor vehicle;
a stopper configured to be inserted into the central aperture of the bearing bracket to couple the bearing bracket to the surface of the interior of the motor vehicle; and
a separately formed first wing configured to transition from an installation position to a locked position when the stopper is inserted into the central aperture of the bearing bracket, the first wing having an L-shape comprising a first limb and a second limb, wherein the first limb of the first wing projects into the central aperture, and the second limb of the first wing projects out of the central aperture and into a recess in the surface of the interior of the motor vehicle when the first wing is in the installation position, and wherein the second limb of the first wing engages behind the surface of the interior of the motor vehicle when the first wing is in the locked position;
wherein the first wing is held in the installation position by a first force applied by a spring, the first wing configured to transition to the locked position when a second force applied by insertion of the stopper into the central aperture of the bearing bracket is greater than the first force applied by the spring, and wherein the spring comprises a spring tongue integrally formed on the bearing bracket and disposed within the central aperture of the bearing bracket.

14. The fastening device of claim 13, comprising a second wing having a first limb and a second limb, the second wing disposed adjacent to the first wing.

15. The fastening device of claim 14, comprising a web extending out of the stopper and through the central aperture of the bearing bracket, wherein a first transition region of the first wing and a second transition region of the second wing are positioned adjacent to the web when the first wing and the second wing are in the installation position.

* * * * *